United States Patent
de Almeida et al.

(10) Patent No.: US 7,400,798 B2
(45) Date of Patent: Jul. 15, 2008

(54) OPTICALLY CONTROLLED PHOTONIC SWITCH

(75) Inventors: Vilson Rosa de Almeida, Sao Jose dos Campos (BR); Carlos Angulo Barrios, Toledo (ES); Roberto R. Panepucci, Miami, FL (US); Michal Lipson, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 171 days.

(21) Appl. No.: 11/137,126

(22) Filed: May 25, 2005

(65) Prior Publication Data

US 2006/0023997 A1 Feb. 2, 2006

Related U.S. Application Data

(60) Provisional application No. 60/574,293, filed on May 25, 2004.

(51) Int. Cl.
*G02B 6/26* (2006.01)
(52) U.S. Cl. .................. 385/32; 385/131; 385/132; 385/14; 385/31; 385/27; 385/30
(58) Field of Classification Search ............ 385/5, 385/14–24, 49–50, 131–132, 27
See application file for complete search history.

(56) References Cited

U.S. PATENT DOCUMENTS

| 4,877,299 | A | 10/1989 | Lorenzo et al. | |
|---|---|---|---|---|
| 6,904,187 | B2 * | 6/2005 | Fischer et al. | 385/5 |
| 6,947,632 | B2 * | 9/2005 | Fischer | 385/27 |
| 2003/0123780 | A1 | 7/2003 | Fischer | |

FOREIGN PATENT DOCUMENTS

WO WO-2004/017125 A1 2/2004
WO WO-2005/116708 A1 12/2005

OTHER PUBLICATIONS

Ibrahim et al., "All-Optical Switching in a Literally Coupled Microing Resonator by Carrier Injection", Jan. 2003, IEEE Photonics Technology Letters, vol. 15, No. 1, pp. 36-38.*
Ibrahim et al., "All-Optical Switching in a Laterally Coupled Microing Resonator by Carrier Injection", Jan. 2003, IEEE Photonics Technology Letters, vol. 15, No. 1, pp. 36-38.*
Almeida et al. "All optical switch on a silicon chip," lasers and electro-optics, 2004, (CLEO) conference on May 16, 2004.*
"International Search Report for corrresponding PCT Application No. PCT/US2005/018286", (Sep. 9, 2005), 4 pgs.
Almeida, V. R., et al., "All-Optical Switch on Silicon Chip", *Lasers and Electro-Optics*, 1, (May 16, 2004), 1027-1029.
Barrios, C. A., "Low-Power Consumption Short-Length and High-Modulation-Depth Silicon Elctrooptic Modulator", *Journal of Lightwave Technology*, 21(4), (2003), 1089-1098.
Ibrahim, T. A., et al., "All-Optical Switching in a Laterally Coupled Microring Resonator by Carrier Injection", *Photonics Technology Letters*, 15(1), (Jan. 2009), 36-38.

* cited by examiner

*Primary Examiner*—Frank G. Font
*Assistant Examiner*—Guy G Anderson
(74) *Attorney, Agent, or Firm*—Schwegman, Lundberg & Woessner, P.A.

(57) ABSTRACT

Fast, all optical switching of light is provided on silicon, using highly light confining structures to enhance the sensitivity of light to small changes in refractive index. In one embodiment, the light confining structures are silicon micrometer-size planar ring resonators which operate with low pump light pulse energies.

23 Claims, 5 Drawing Sheets

OPTICALLY CONTROLLED PHOTONIC SWITCH

RELATED APPLICATION

This application claims priority to U.S. Provisional Application Ser. No. 60/574,293 (entitled All-Optical Switch on Silicon, filed May 25, 2004) which is incorporated herein by reference.

GOVERNMENT FUNDING

The invention described herein has been made with U.S. Government support under Grant Number ECS-0300387 awarded by the Center for Nanoscale Systems, supported by the National Science Foundation and U.S. Grant Numbers DOD - AFOSR - No. F49620-02-1-0396 and DARPA - No. W911NF-06-1-0057. The United States Government has certain rights in the invention.

BACKGROUND

Photonic circuits in which beams of light redirect the flow of other beams of light, are a long-standing goal for developing highly integrated optical communication components. Ideally, circuits based on optical interconnects would be constructed using sub-micron-size devices in which photons are manipulated in a manner similar to that how electrons are manipulated in a semiconductor electrical circuit. Furthermore, it is highly desirable to use silicon, the dominant material in the microelectronic industry, as the platform for these photonic chips. Photonic structures that bend, split, couple and filter light have recently been demonstrated in silicon, but the flow of light in these structures is predetermined by the structure design and cannot be modified.

All-optical switches and modulators have been demonstrated with III-V compound materials based on photo-excited free-carrier concentrations resulting from one or two photon absorption. However, in silicon, all-optical switching has only been demonstrated in large, out-of-plane structures using very high powers. High powers, large size, and out-of-plane geometries are inappropriate for effective on-chip integration. The difficulty in modulating light using silicon structures arises from the weak dependence of the refractive index and absorption coefficient on the free-carrier concentration. For example, a 300 μm long Mach-Zehnder modulator based on rib waveguides with mode-field diameter (MFD) of about 5 μm, a minimum optical pump pulse energy of 2 mJ is needed to modify the refractive index by $\Delta n=-10^{-3}$ in order to achieve 100% modulation. The absorption due to free-carriers under such high powers is also small (16 dB/cm for a 450 nm wide and 250 nm high rectangular cross section waveguide) which demands a straight waveguide as long as 600 μm in order to achieve modulation depth of 90%.

SUMMARY

Fast, all optical switching of light is provided on silicon, using highly light confining structures to enhance the sensitivity of light to small changes in refractive index. In one embodiment, the light confining structures are silicon micrometer-size planar ring resonators which operate with low pump light pulse energies. Refractive index changes as small as $10^{-3}$ may induce a large modulation dept of 80% in a compact 20 μm structure. In one embodiment, structures can be modulated by more than 97% in less than 500 ps using light pulses with energies as low as 40 pJ.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1A:
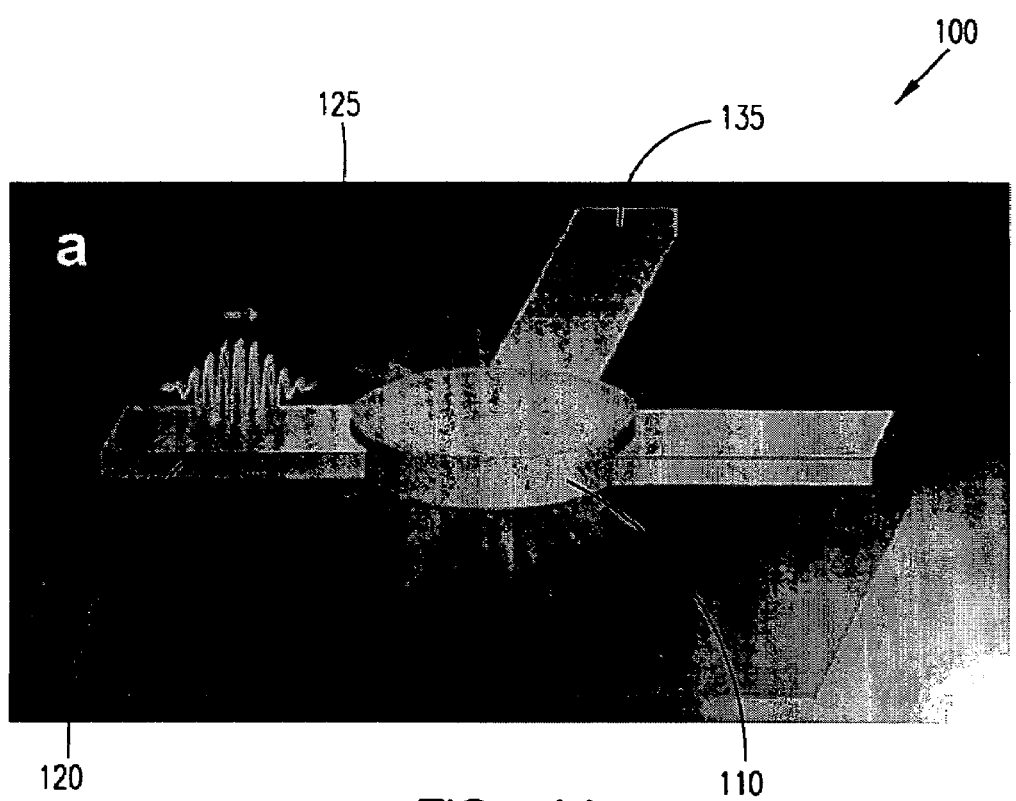
FIGS. 1A, 1B, 1C and 1D are schematic block diagrams of a gate photonic structure according to an example embodiment.
Figure 1B:
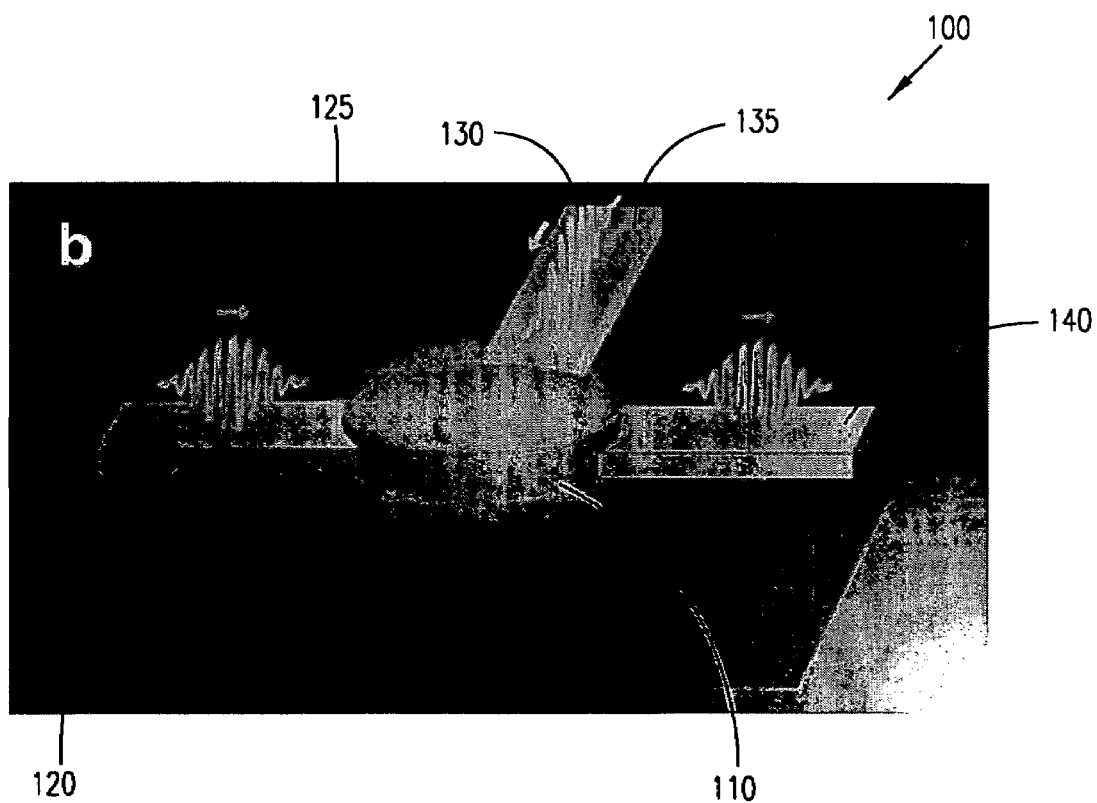

A block schematic diagram of an all optical gate is shown generally at 100 in FIGS. 1A and 1B. A gate 110 intersects a waveguide 120 on which probe signals 125 are provided at an input side of waveguide 120. The gate 110 is controlled by a control signal 130 on a control waveguide 135, which is coupled to the gate 110. In one embodiment, the gate is a silicon micrometer-size planar ring resonator, and the control signals are provided a low pump-pulse energies. In FIG. 1A, probe signals 125 stop at the gate 110, which is not being provided pulses of light. The gate is in an off state, and the probe signal does not penetrate the gate. In FIG. 1B, the control signal 130, in the form of light pulses is provided on control waveguide 135. The result is that the control signal 130 serves to open the gate 110, and allows the probe signals 125 to be transmitted to an output side 140 of waveguide 120.

In one embodiment, the resonator has a resonant frequency that is slightly different than that of the probe signals. The control signals function to change the refractive index of the resonator, and thus change the resonant frequency of the resonator to be close to, or equal to the frequency of the probe signals, allowing the probe signals to enter the gate 110 and prevent propagation of the probe signals. The control signals operate to effectively switch the resonator on or off. In further embodiments, the resonator may have the same resonant frequency as the frequency of the probe signals, and the control signals operate to change the resonant frequency, and in effect, switch off the resonator, allowing signals to propagate to the output side 140 of waveguide 120.

Figure 1C:
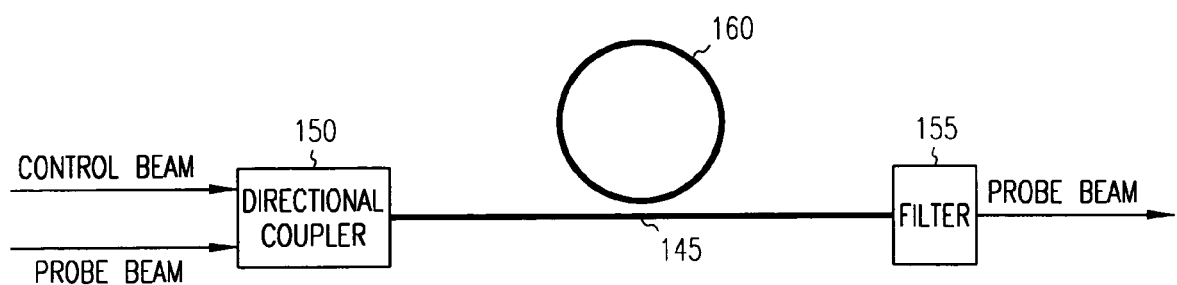

FIG. 1C illustrates provision of probe and control signals through a single waveguide 145. The control signal or beam and probe signal such as a beam are provided through a directional coupler 150 through waveguide 145 and the control signal is filtered by a filter 155, to remove it from an output signal. It may also be filtered further downstream in processing the output signal. A ring resonator 160 is optically coupled to the waveguide 145 to operate as a switch, controlled by the control signal.

Figure 1D:
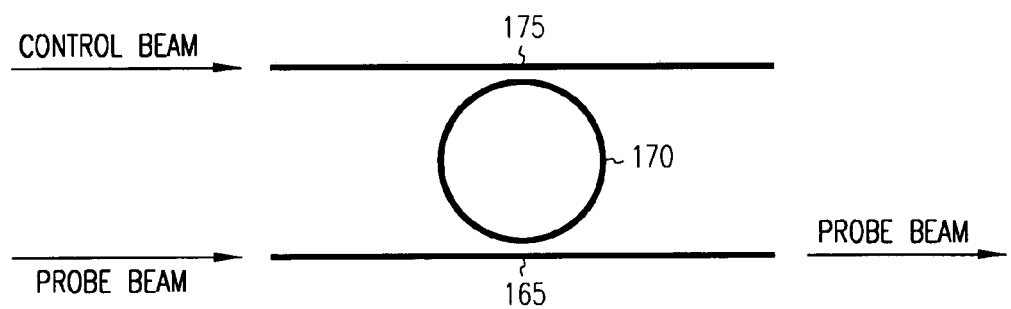

FIG. 1D illustrates a further embodiment, where a probe waveguide 165 is optically coupled to a resonator, such as a ring resonator 170. A control waveguide 175 is also optically coupled to the ring resonator 170 to control switching characteristics of the ring resonator 165.

Figure 2:
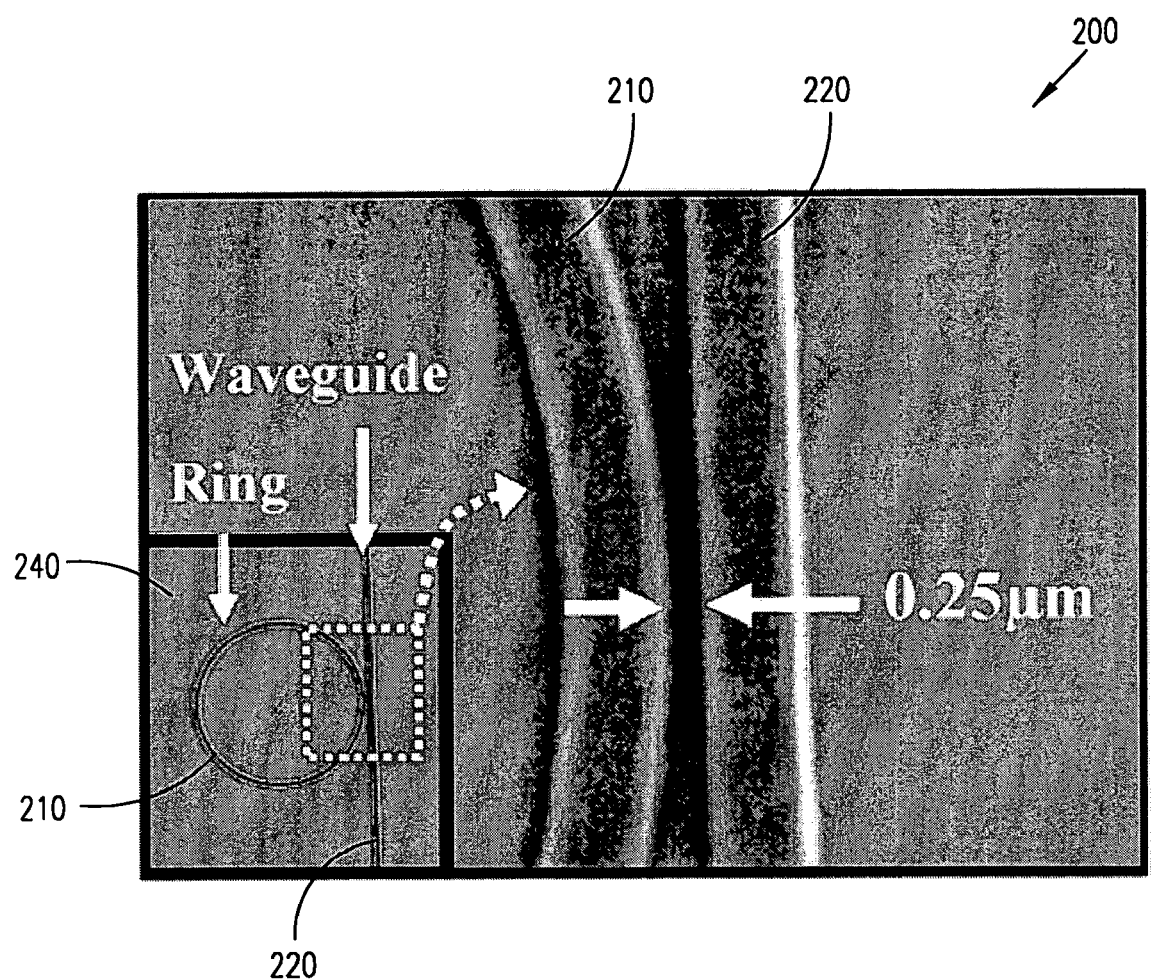
FIG. 2 is a scanning electron micrograph top view of a ring resonator coupled to a waveguide according to an example embodiment.

FIG. 2 is a scanning electron micrograph showing a top view of a portion of a ring resonator based optical switch shown generally at 200. The switch comprises a 10 μm diameter ring resonator 210, patterned by electron-beam lithography, and subsequently etched by inductively coupled plasma reactive ion etching. A waveguide 220 is positioned proximate the ring resonator 210, such that it is optically coupled to the ring resonator 210. The ring resonator 210 is formed by a substantially circular waveguide, while waveguide 220 is relatively straight and substantially tangentially positioned with respect to ring resonator 210, approximately 0.25 μm away from ring resonator 210 at the closest point. In further embodiments, waveguide 220 and resonator 210 are either in plane, or out of plane with respect to each other. Inset 240 shows the entire ring structure. While waveguide 220 is shown as substantially straight, it may bend or curve to transport signals to desired locations on a chip.

The rectangular cross section of the waveguides is approximately 450 nm wide by 230 nm high in one embodiment. Other dimensions may also be used that significantly vary from those dimensions. The transmissions of the ring resonator coupled to the waveguide are highly sensitive to the signal wavelength and is greatly reduced at wavelengths in which the ring circumference corresponds to an integer number of guided wavelengths.

In further embodiments, other types of micro-resonators, such as Fabry-Perot and photonic crystal based cavities made of silicon may be used as all-optical gates. The principles of operation remain the same. Light enters the resonator when it is on resonance, and light inside the resonator reaches a maximum intensity when it is on resonance.

Figure 3:
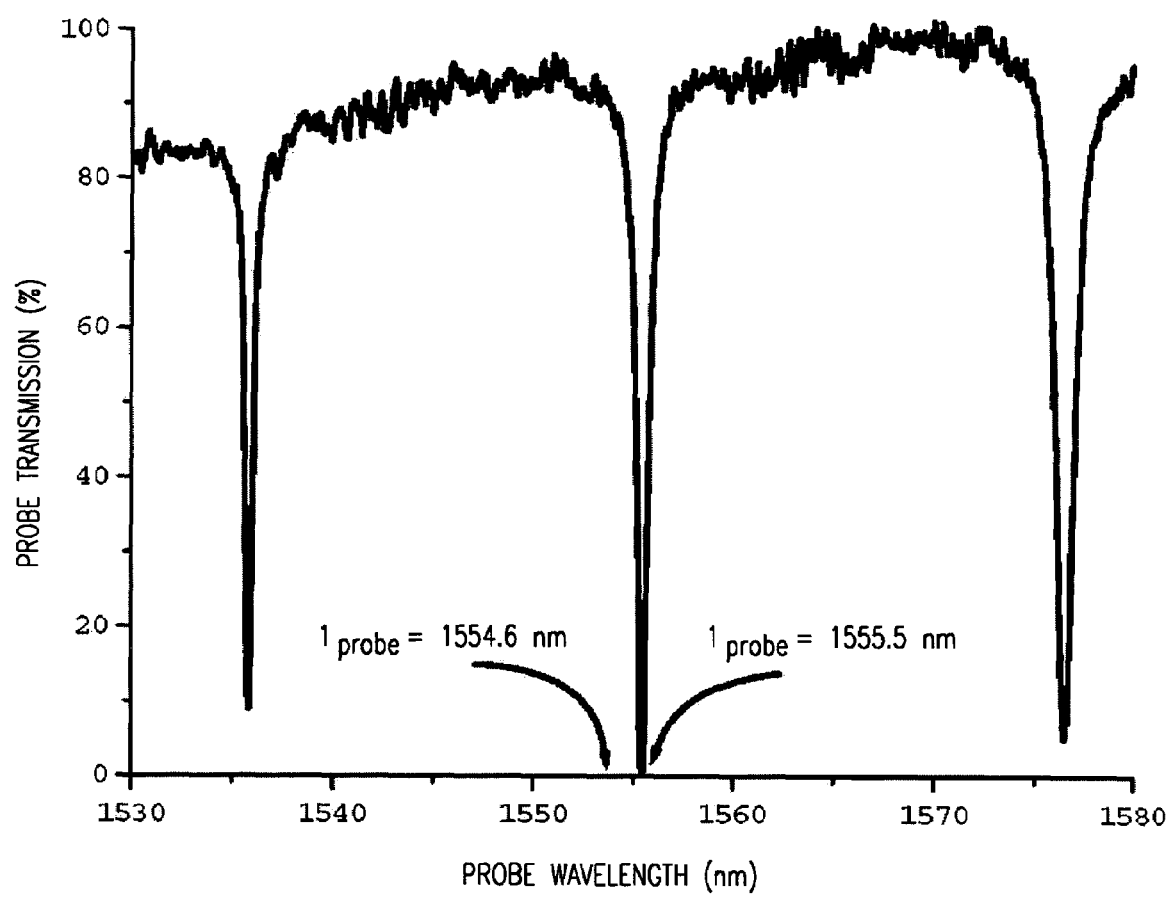
FIG. 3 is graph of a spectral response of a single-coupled ring resonator with no optical pump according to an example embodiment.

FIG. 3 shows the quasi-TM transmitted dynamic spectral response of the structure of FIG. 2 at two different wavelengths. The quasi-TM mode is characterized by the magnetic field oriented predominantly along the plane of the chip. On-resonance, the transmitted power drops by more than 10 dB with respect to that at off-resonance. The losses at off-resonance wavelengths are 3.5 dB, which include the fiber-to-waveguide coupling losses and the propagation losses in the 7-mm long waveguide that couples the probe light to the ring resonator. The intrinsic losses introduced by the ring resonator are estimated to be 0.5%. The cavity quality factor is $Q \approx \lambda_0/\Delta\lambda_{FWHM}=2,290$, where $\lambda_0=1,555.5$ nm is the resonance wavelength, and $\Delta\lambda_{FWHM}=0.68$ nm is the resonance full-width-at-half-maximum. This quality factor corresponds to a cavity photon lifetime of $\lambda_0^2/(2\pi c \lambda_{FWHM})=1.8$ ps, where c is the speed of light in vacuum. Thus, despite the resonant nature of the structure, the temporal response of this ultra small optical gate can theoretically be as short as a few picoseconds.

By tuning the effective index of the ring waveguide, the resonance wavelength is modified which induces a strong modulation of the transmitted signal. Femtosecond pump pulses centered at a wavelength $\lambda_{pump}=400$ nm may be used to inject free carriers within the ring resonators, and thereby tune its effective refractive index. At this wavelength, the strong linear absorption in silicon causes 90% of the photons transmitted into the top-Si layer to be absorbed within a thickness of only 250 nm. Once the pulse is absorbed, photo-excited free-carrier electron-hole pairs are generated inside the ring resonators and are subjected to recombination dynamics dictated by the free-carrier lifetime.

In one embodiment, a laser source for the pump is a mode-locked Ti:sapphire laser that generates 100-fs pulses at 800 nm with 5 nJ of energy at a 80-MHz repetition rate. A beta-barium-borate (BBO) crystal is used to generate second harmonic femtosecond pulses centered at $\lambda_{pump}=400$ nm. The energy of the pulse incident on the ring resonator plane is less than 40 pJ. A tunable continuous-wave laser which is partially polarized at the input to the waveguide provides the probe signal in the wavelength range from 1520 to 1620 nm. The probe laser may be coupled into the Si waveguide by an external tapered lens fiber and an on-chip fiber to waveguide nanotaper coupler.

The quasi TM transmitted light is collimated by a lens (NA=0.55), discriminated by a polarizer, and focused into a multimode fiber through a collimator. The probe signal is detected by a high speed DC 5 GHz photo detector with a nominal fall/rise time of 70 ps. A 20 GHz digital sampling oscilloscope may be used to record the probe signal.

Figure 4:
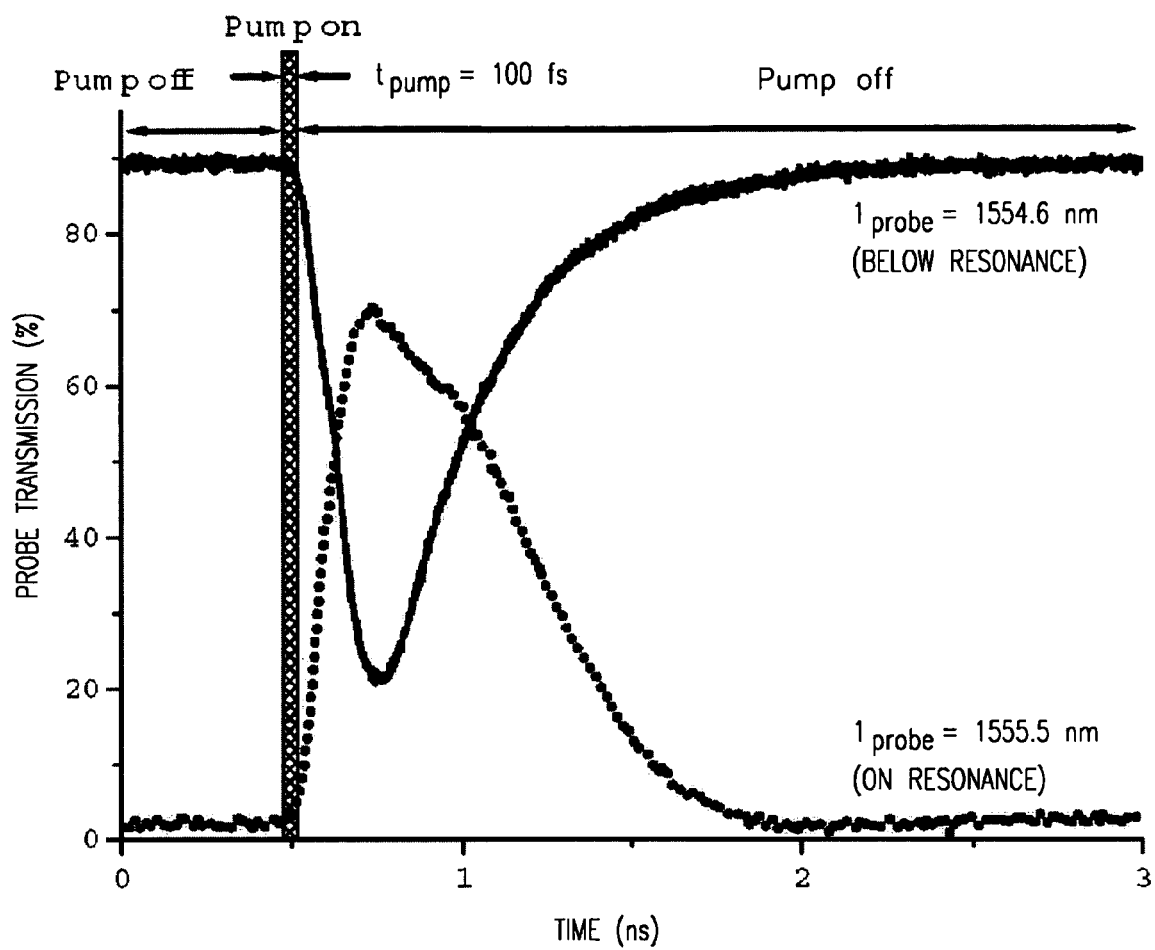
FIG. 4 is a graph of a temporal response of a probe signal to pump excitation illustrating transmission for probe wavelengths below and on resonance according to an example embodiment.

The temporal response of the transmitted probe signals are shown in FIG. 4 for two distinct probe wavelengths: $\lambda_{probe}=1,554.6$ nm (below resonance—represented by a solid line). The measured modulation depth (MD) is defined as MD=$(I_{max}-I_{min})/I_{max}$, where $I_{max}$ and $I_{min}$ are, respectively the maximum and minimum probe optical power signal for a fixed wavelength. The modulation depth is about 75% for $\lambda_{probe}=1,554.6$ nm and 97% for $\lambda_{probe}=1,555.5$ nm (on resonance—represented by a broken line). The measured modulation depth is limited only by the photodetector response time. For a photodetector with a response time of less than 20 ps, modulation depths of nearly 100% are expected at both probe wavelengths.

By assuming an instantaneous spectral shift of the spectrum shown in FIG. 3, followed by a simple exponential decay representing the free-carrier relaxation time, a wavelength peak shift of $\Delta\lambda=-1.1$ nm and a relaxation time of $\tau_{fc}=450$ ps are obtained. This relaxation time, much shorter than the bulk Si free-carrier lifetime, is not fundamental, and is due to fast recombination mechanisms on the unpassivated sidewalls of the structures. By manipulating the degree of passivation or using implantation, this time could be further decreased. The wavelength peak shift of the ring resonator corresponds to an effective index change of $\lambda_{neff}=-1.45\times10^{-3}$, or equivalently to a refractive index change in the silicon core of $\Delta nSi=-1.6\times10^{-3}$. This refractive index change is caused by a free carrier concentration of $\Delta N=\Delta P=4.8\times10^{17}$ cm$^{-3}$. The losses due to absorption, estimated from free-carrier concentration of $\Delta\alpha=6.9$ cm$^{-1}$, significantly lower than the estimated scattering losses in the ring resonator of $\alpha_{ring}=33.6$ cm$^{-1}$. The relative low absorption losses indicate that the observed modulation is due only to a refractive index change and that thermal effects can be neglected. This is of foremost importance for the application of the proposed device as an all-optical gate, enabling near 100% transmission of the data signal once the gate is open. It is also important for routing applications in which recycling of light is desired. For such devices, a modified ring resonator where the ring is coupled to two waveguides could be used.

The micro-ring resonator described here acts as an ultrafast all-optical compact silicon on chip modulator. Under optical excitation, the structure can be made to be almost completely opaque or transparent, thereby acting As an all optical gate. The device may enable a whole range of new on-chip functionalities, such as all-optical switches, modulators, routers, and tunable filters. It may form the basis for new on-chip architectures in applications involving ultrafast all-optical communication, on-chip interconnect and chip to chip interconnect.

The invention claimed is:

1. A gate photonic structure comprising:
   a silicon waveguide;
   a silicon planar optical resonator optically coupled between an input and output of the silicon waveguide; and
   a silicon control waveguide coupled to the silicon optical resonator wherein the silicon control waveguide provides light pulses which circulate in the silicon optical resonator and generate free-carriers within the optical resonator to modify the resonant frequency of the silicon optical resonator utilizing two photon absorption.

2. The gate photonic structure of claim 1 wherein the intensity of the light pulses is below that necessary to generate the Kerr effect.

3. The gate photonic structure of claim 2 wherein the pulses are femtoseconds in length.

4. The gate photonic structure of claim 2 wherein the pulses are approximately 100 femtosecond pulses at a wavelength of 800 nm with 5 nJ of energy at a 80 MHz repetition rate.

5. The gate photonic structure of claim 2 wherein the pulses are at a wavelength of approximately 400 nm.

6. The gate photonic structure of claim 2 wherein the light pulses are provided by a laser.

7. The gate photonic structure of claim 1 wherein the waveguide and optical resonator have substantially rectangular cross sections that are approximately 450 nm wide and 250 nm high and are highly light confining.

8. The gate photonic structure of claim 1 wherein the effective index of refraction of the resonator is changed by at least $10^{-3}$.

9. The gate photonic structure of claim 1 wherein the optical resonator comprises a high light confining silicon ring resonator.

10. The gate photonic structure of claim 1 wherein the waveguide and the control waveguide comprise the same waveguide carrying both a probe beam and a control beam.

11. The gate photonic structure of claim 10 and further comprising a filter coupled to an output of the waveguide.

12. A gate photonic structure comprising:
    a waveguide having an input and an output;
    a planar silicon optical resonator optically coupled to the waveguide; and
    a control waveguide coupled to the optical resonator to generate free carriers in the silicon optical resonator to modify the resonant frequency of the optical resonator via two photon absorption, wherein the waveguides and resonator are adapted to be highly light confining and made of silicon.

13. The gate photonic structure of claim 12 wherein the optical resonator comprises a ring resonator.

14. The gate photonic structure of claim 13 wherein the ring resonator has a diameter of approximately 10 μm or less.

15. The gate photonic structure of claim 12 wherein the control waveguide provides light pulses to modify the resonant frequency of the optical resonator.

16. The gate photonic structure of claim 15 wherein the pulses are femtoseconds in length.

17. The gate photonic structure of claim 16 wherein the pulses have an energy of approximately 40 pJ or less.

18. The gate photonic structure of claim 17 wherein the resonator has a free-carrier relaxation time of approximately 450 ps or less.

19. The gate photonic structure of claim 12 wherein the waveguides and optical resonator have substantially rectangular cross sections that are approximately 450 nm wide and 250 nm high.

20. The gate photonic structure of claim 12 wherein the effective index of refraction of the resonator is changed by at least $10^{-3}$.

21. A gate photonic structure comprising:
    a highly light confining silicon waveguide;
    a highly light confining planar silicon optical resonator optically coupled between an input and output of the waveguide; and means for modifying the resonant frequency of the optical ring resonator by providing light pulses which circulate in the silicon optical resonator and generate free-carriers within the silicon optical resonator to modify the resonant frequency of the silicon optical resonator utilizing two photon absorption.

22. The gate photonic structure of claim 21 wherein the optical resonator comprises a ring resonator.

23. A method comprising:
    receiving an input optical signal on a highly light confining silicon waveguide; optically modulating a resonant frequency of a highly light confining silicon planar optical resonator by generating free carriers in the silicon planar optical resonator from a silicon waveguide provided control signal resonating within the resonator to modify the resonant frequency of the optical resonator via two photon absorption; and providing an output optical signal as a function of the modulated effective refractive index of the optical resonator.

* * * * *